May 30, 1967  G. MERSCH  3,322,401

IMPELLERS AND MIXING APPARATUS

Filed July 13, 1965  11 Sheets-Sheet 3

May 30, 1967 G. MERSCH 3,322,401
IMPELLERS AND MIXING APPARATUS
Filed July 13, 1965 11 Sheets-Sheet 4
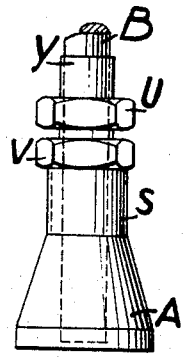
FIG.10.
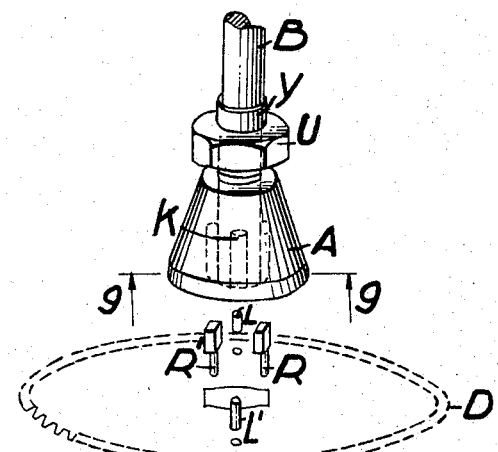
FIG.8.
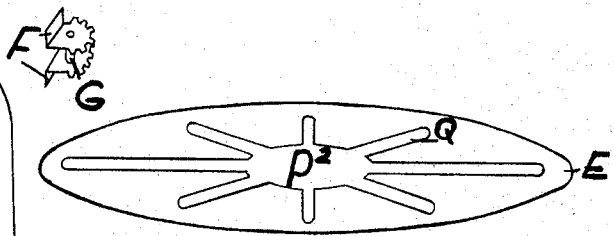
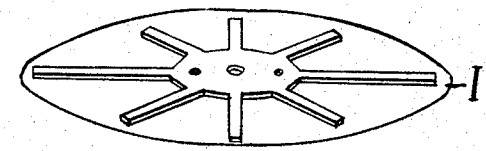
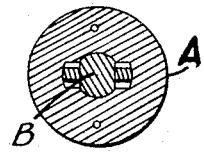
FIG.9.

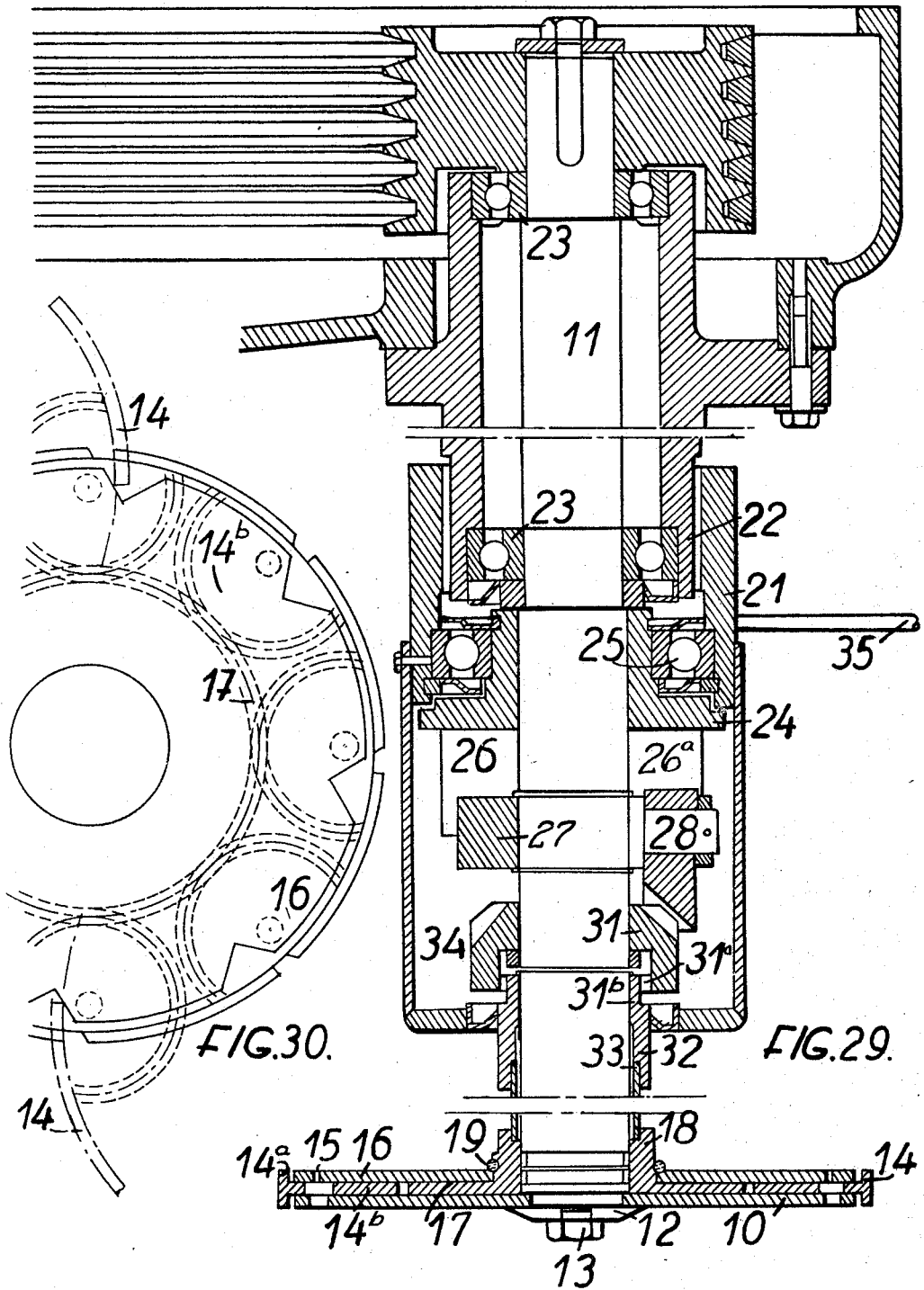

May 30, 1967  G. MERSCH  3,322,401
IMPELLERS AND MIXING APPARATUS
Filed July 13, 1965

May 30, 1967

G. MERSCH 3,322,401

IMPELLERS AND MIXING APPARATUS

Filed July 13, 1965

May 30, 1967  G. MERSCH  3,322,401
IMPELLERS AND MIXING APPARATUS
Filed July 13, 1965  11 Sheets-Sheet 10

United States Patent Office 3,322,401
Patented May 30, 1967

3,322,401
IMPELLERS AND MIXING APPARATUS
Georges Mersch, Luxembourg, Luxembourg, assignor to Societe Anonyme Colortex, a corporation of Luxembourg
Filed July 13, 1965, Ser. No. 471,569
Claims priority, application Luxembourg, Apr. 10, 1961, 39,997; Mar. 2, 1962, 41,320
20 Claims. (Cl. 259—108)

This application is a continuation-in-part of my co-pending application, Ser. No. 185,138, filed Apr. 4, 1962.

The present invention relates to mixing apparatus and particularly to turbine type impellers used to effect mixing, disintegration, homogenization, emulsification and dispersion of solids in liquids, gases in liquids or two or more liquids at low or high concentrations to produce compositions having a wide range of viscosities.

Impellers in accordance with the invention are designed to operate at relatively high speeds as compared to low speed agitators heretofore employed. In contrast with low speed agitators which act directly on a major portion of the volume of material to be treated, high speed impellers act directly on only a fraction of the volume of material, but induce translatory movement of the material causing the material to circulate so as to bring all portions of the material cyclically into the zone of operation of the impeller.

Mixing apparatus with impellers of the turbine type have generally comprised a motor with a shaft to the lower extremity of which is affixed a circular plate or disc provided with peripheral vanes or teeth, each having a face extending perpendicular to the plane of the plate and disposed at a fixed angle to a tangent to the plate at its periphery.

This type of impeller when properly used has given good results, but it has several drawbacks. For example, with apparatus provided with a given driving power for a given material viscosity, good results are obtained with a properly designed impeller and a container of proper size and volume. However, if any of these parameters is varied, the results obtained are impaired.

Upon rotation of the impeller in the material to be treated, the teeth or vanes on the rotating plate or disc of the impeller eject the material by centrifugal force. The speed at which the material is ejected and the quantity of material ejected depend on the number of revolutions, the impeller diameter and the fixed angle of the vane relative to the peripheral tangent of the impeller, as well as on the physical characteristics of the material being treated and the characteristics of the container.

The material ejected by the teeth or vanes is forcibly projected against the ambient material. It is subjected to shock and lamination and by its impact on the ambient material it produces a cyclical movement causing the material to circulate in the container so as to bring all portions of the material successively to the impeller. This cyclical movement must be neither too fast nor too slow, but just sufficient to cause the material to recirculate through the work zone of the impeller. If the speed of circulation is too slow, all portions of the material are not adequately treated. If it is too fast, the material tends to climb higher and higher on the peripheral wall of the container and to withdraw farther and farther away from the center of the impeller. It is thereby compelled to travel an increasing distance thereby decreasing the efficiency of the mixing apparatus. Moreover, if the quantity of material returning to the impeller is less than the quantity of material ejected, cavitation of the impeller occurs.

The greater the speed at which the material is ejected by the impeller, the greater is the shock and impact on the ambient material tending to break up agglomerates of the material and promote mixing. It has been found through experience that when conditions are correct, approximately 75% of the energy imparted to the material by the impeller is dissipated in such shock while the remaining 25% serves to circulate the material in the tank. From this, it would appear that it would be advantageous to increase the ejection speed either by increasing the rotative speed or the diameter of the impeller. An increase of impeller speed by either of these methods produces a higher ejection speed and a more powerful shock. It also produces a larger volume of ejected material. After dissipation of the shock energy, the balance of available velocity causes the material to circulate at both a higher speed and greater volume in the container. This results in a larger portion of the energy being dissipated in producing circulation of the material in the container, thereby decreasing the efficiency of the apparatus. Moreover, since the material surrounding the impeller is retreating from the impeller at a rapid rate and large volume, the impact of the ejected material on the surounding material is decreased thereby resulting in a further decrease in efficiency.

In order to obtain full utilization of equipment, it is frequently desirable to be able to use the same mixing apparatus for different materials. Moreover, during the production of a single composition, the viscosity of the material frequently changes substantially during successive stages of treatment. When viscosity increases to a point where the rotational speed of the impeller no longer produces the required circulation of the material, proper mixing cannot be obtained and it is hence necessary either to reduce viscosity, decrease tank size or increase the diameter or rotational speed of the impeller. Any artificial decrease in viscosity is undesirable since it affects the characteristics of the material being produced. Reduction of tank size is impractical and uneconomical, particularly in industries making numerous different products. Replacing an impeller during operation is inconvenient and time consuming. Modification of the speed of rotation of the impeller requires speed change mechanism which is expensive and involves additional maintenance.

On the other hand, if the viscosity of the material decreases, a state of turbulence is quickly reached and the mixing does not proceed efficiently. It is then necessary to change the impeller to a smaller size, in order to reduce the peripheral speed of the impeller. If the impeller size is maintained, speed change mechanism is required in order to decrease the rotational speed and hence the peripheral speed of the impeller.

It is an object of the present invention to overcome these problems and disadvantages and to provide mixing apparatus having a wide flexibility of operating characteristics which makes it possible to use the same mixing apparatus for different materials and also to maintain high operating efficiency despite changes in viscosity or other parameters during the mixing operation.

In accordance with the invention, there is provided mixing apparatus having an impeller comprising a support plate or disc carried by a rotating shaft and provided at its periphery with a plurality of vanes or blades which are movably mounted on the disc and control means for simultaneously moving the impeller blades to selected positions, preferably during operation of the mixing apparatus, so as to provide different operating characteristics suitable for different materials or different conditions without the need of changing the direction or speed of rotation of the impeller. The operating characteristics of the impeller may be varied by varying the angular position of the impeller blades relative to the rotating support plate, varying the effective area of the impeller blades, varying the effective diameter of the impeller or by a combination of these variations.

A further feature of the invention is to provide for control of the quantity of the material ejected by the impeller independently of ejection speed. Ordinarily, the quantity of material ejected is a function of ejection speed, in that a higher ejection speed results in ejecting more material. In some instances, however, it is desirable to increase or decrease the quantity of material ejected without varying ejection speed, or conversely it may be desired to vary the ejection speed while maintaining substantially constant the quantity of material ejected. This is accomplished in accordance with the present invention by providing an impeller comprising a support plate and a plurality of impeller vanes which have been mounted on the plate in such manner that they can readily be removed and replaced. This permits the removal of the impeller blades to vary the number of blades on the impeller. By increasing or decreasing the number of active blades, it is possible to increase or decrease the quantity of material ejected while maintaining the ejection velocity substantially constant; moreover, the easy removal and replacement of the impeller blades by blades of different form or characteristics in order to change the operating characteristics of the impeller.

With apparatus in accordance with the invention, it is possible to achieve, with a constant shaft speed and hence without the need of a variable speed drive, variation of the peripheral speed of the impeller, variation of ejection speed of material by the impeller, variation in the volume of material ejected or any combination of these variations. The invention thus provides mixing apparatus having great flexibility and adaptability in its operating characteristics.

Other objects, advantages and features of mixing apparatus in accordance with the present invention will appear more fully from the following description and claims in conjunction with the accompanying drawings in which, FIG. 1 is a schematic side view of mixing apparatus with an impeller operating from above a mixing tank.

FIG. 8 is an exploded schematic perspective view similar to FIG. 6 but showing a further modification.

FIG. 9 is a cross sectional view taken approximately on the line 9—9 in FIG. 8.

FIG. 10 is a side elevation showing a further modification of a portion of the mixing impeller illustrated in FIG. 8.

FIG. 29 is an axial sectional view of a mixing impeller and associated parts for control of the impeller vanes during operation of the mixing apparatus.

FIG. 30 is a partial schematic plan view of the impeller shown in FIG. 29.

Figure 1:
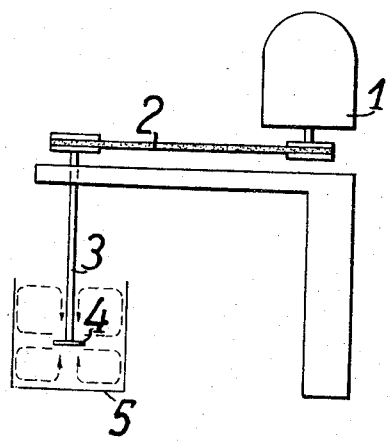
Figure 2:
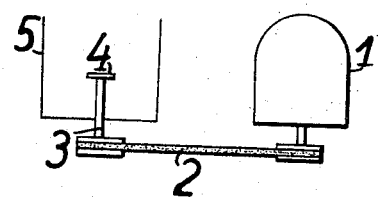
FIG. 2 is a schematic side view of mixing apparatus with an impeller operating from underneath a mixing tank.

FIGS. 1 and 2 illustrate schematically mixing apparatus comprising a motor 1, transmission belt 2, impeller shaft 3, impeller 4 and a container 5 for the material to be mixed. In FIG. 1, the impeller shaft is shown entering the container from the top while in FIG. 2, the impeller shaft 3 enters the container 5 from the bottom through a suitable rotary seal. While the impeller shafts are shown in a vertical position, they may also be inclined at an angle to the vertical. The transmission belt 2 is shown only by way of example and may be replaced by other transmission means, for example, a direct drive or variable speed coupling.

Figure 3:
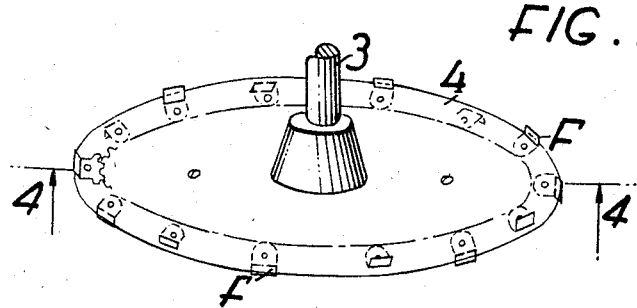
FIG. 3 is a schematic perspective plan view of one embodiment of a mixing impeller in accordance with the invention.
Figure 4:
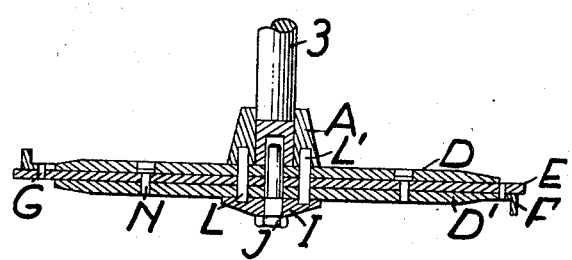
FIG. 4 is a vertical cross section taken approximately along the line 4—4 in FIG. 3.
Figure 5:
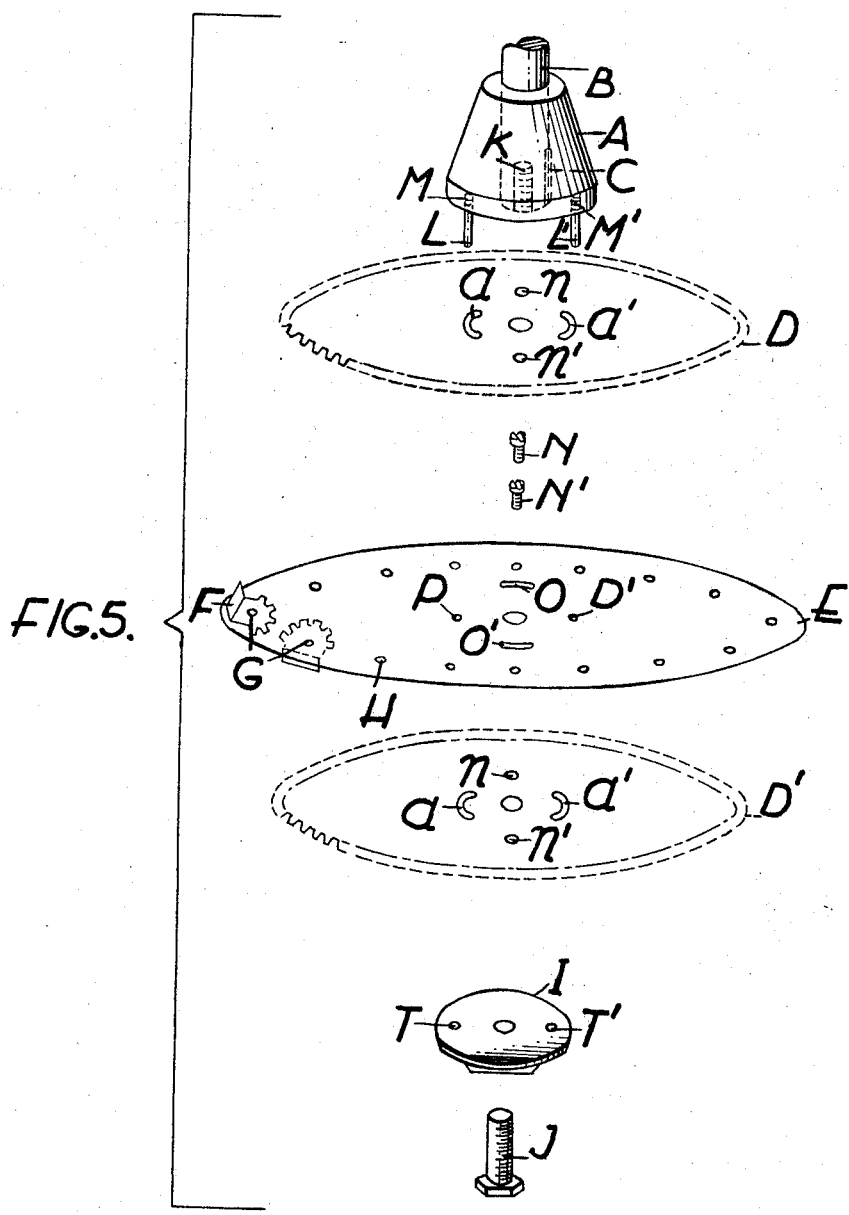
FIG. 5 is an exploded schematic perspective view showing the various parts constituting the impeller of FIGS. 3 and 4.

An example of an impeller in accordance with the invention is shown in FIGS. 3, 4 and 5 as comprising a hub A fixed on shaft 3 by a key C. Gear plates D and D' are positioned respectively on the upper and lower faces of an impeller vane supporting plate E. A plurality of vanes F, each having an outwardly projecting blade or tooth portion and an integral gear portion are pivotally mounted on the support plate E, for example by rivets G received in perforations H of the plate. The vanes F are shown as being mounted alternately on the upper and lower faces of the support plate E with the gear portions of the vanes flat against the respective faces of the support plate. The gear plates D and D' and support plate E are clamped together by means of a pressure plate I which engages the lower gear plate D' and is pressed upwardly by a screw J inserted through a central hole of the pressure plate I and screwed into a tapped axial bore in the lower end of the shaft 3.

When the screw J is tightened, the component parts of the impeller are presented from pivoting around the axis of the shaft 3 by two dowel pins L, L' fixed in diametrically opposite recesses M, M' in the hub A and extending through holes P and P' in support plate E and arcuate openings a and a' in gear plates D and D' into diametrically opposite openings T and T' in pressure plate I.

Small stop pins N, N' pass through holes n, n' in gear plate D and through arcuate openings O, O' in support plate E and are screwed into diametrically opposite threaded holes in n, n' in the lower gear plate D'. Hence, when the screw J is tightened, the assembly comprising gear plates D and D' and interposed support plate E are clamped tightly between the pressure plate I and the hub A and are held against rotary angular movement relative to one another. Moreover, the gear portions of the vanes F pivotally mounted on the support plate E mesh with the gear teeth on the peripheries of gear plates D, D' and are, hence, secured against pivotal movement.

If the screw J is loosened a few turns, the plates D, D' and E can become separated slightly from one another and from the hub A. The support plate E cannot turn about its axis relative to the hub since it is held by the dowel pins L, L', but the gear plate D, D' may turn relative thereto by an angle determined by the arcuate extent of the slots a, a' in gear plates D, D' and arcuate slots O, O' in support plate E.

With the plates thus slightly spaced, the gear portions of vanes F are advantageously adjusted in such manner as to position the vertical blade portions of the vanes parallel to the plate E at the respective locations of the vanes while the stop pin N is positioned at the right hand end of the opening O and the stop N' is located at the left hand end of the opening O'. The screw J is then tightened sufficiently to keep the gear portions of the vanes in engagement with the respective gear plates while permitting rotational movement of the gear plates relative to the support plate E. By imparting to the support plate E, a circular movement in a clockwise direction relative to the gear plates D, D', the vanes F are rotated around respective pivots G through the meshing of the gear portions of the vanes with the respective gear plates D, D'. Rotary movement of the gear plates D and D' relative to one another is prevented through their interconnection by the stop pins N, N' passing through arcuate openings O, O' in the support plate E. Hence, all of the vanes on both the upper and lower faces of the support plate E swivel in the same manner and to the same angle. The arcuate dimensions of the slots a, a' in the gear plates and the arcuate slots O, O' in the support plate E are selected so as to permit rotation of the vanes F through an angle of approximately 90°.

In a preferred embodiment of the invention, the adjustability of the vanes as described is combined with the feature of making the vanes detachable so that they can be readily removed and replaced. This feature is particularly advantageous when mixing materials which subject the vanes to abrasion or corrosion so that they wear out sooner than other parts of the impeller. The replaceability of the vanes greatly reduces maintenance costs and in some instances, may permit the use of materials which are less expensive than materials that would be required for permanent vanes. A further advantage of the removability of the vanes is that the number of vanes provided on the impeller may be varied by removing or adding vanes as desired.

Figure 6:
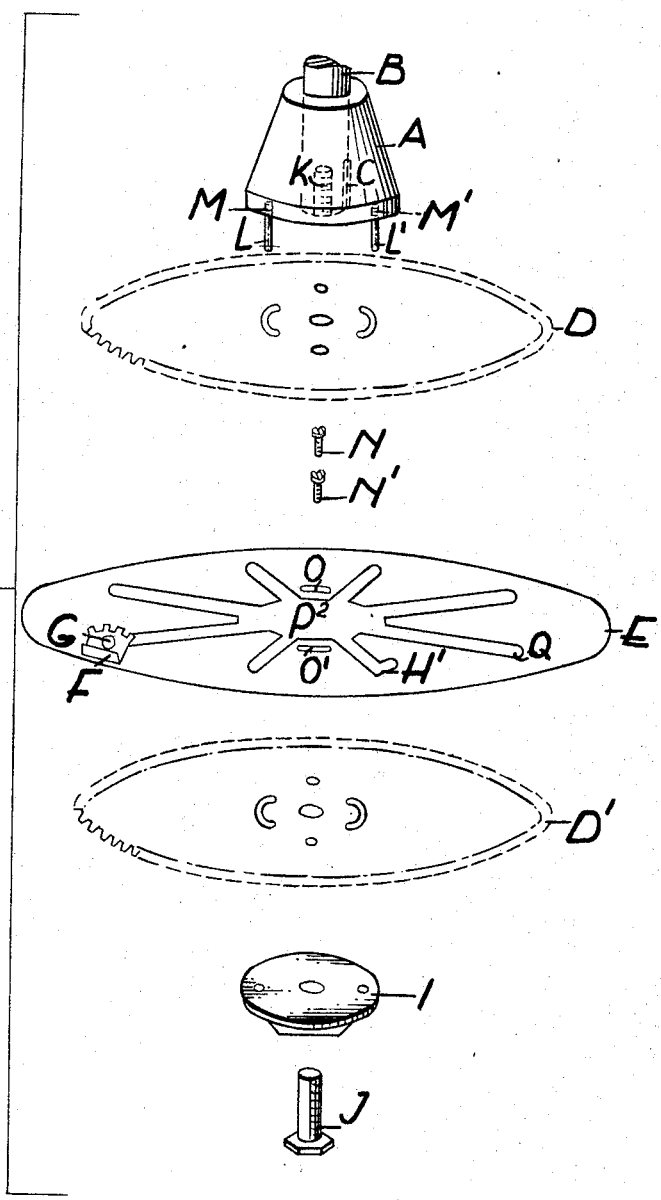
FIG. 6 is an exploded schematic perspective view similar to FIG. 5 but showing a modification.
Figure 28:
FIG. 28 is an exploded perspective view of a single-faced double-geared vane.

Removability and replaceability of the vanes in illustrated by an embodiment shown in FIG. 6 which is similar to that shown in FIGS. 3 to 5 except that the support plate E is provided with a central opening P2 and a plurality of slots Q which radiate outwardly toward but not to the periphery of the plate. The vanes F are introduced through the central opening P2 and slit outwardly to the radially outer ends of the slots Q. When the plates are in assembled relation as illustrated in FIG. 4, the pivot pins of the vanes are held in the outer end portions of the slots Q by engagement of gear portions of the vanes with the respective gear plates D, D'. However, a recess H' may, if desired, be provided at the extremity of each of the radial slots Q to receive the pivot pin of the respective vanes. The slots Q and the recesses H'—if present—are of the dimensions of the vane pivots G. If single vanes are used, the ends of the pivot pins opposite the vanes are provided with suitable heads to retain the pivot pins in the slots. Alternately, double vanes such as those shown in FIGS. 20 to 27 or vanes having two gear portions or only one blade portion as illustrated in FIG. 28 may be used. In this event, the central opening P2 of the support plate E is made large enough to permit the passage of the vane through it during the insertion procedure.

Figure 7:
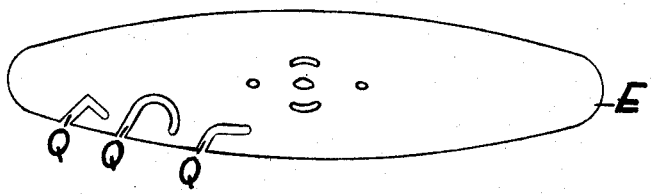
FIG. 7 is a perspective plan view showing a modification of one of the parts shown in FIG. 6.

The detachability of the vanes from the impeller plate can be achieved in other ways. For example, as illustrated schematically in FIG. 7, the support plate E may be provided with various shapes of channels or slots entering the plate from its periphery but shaped so as to retain the vanes against centrifugal force. For example, the slots may be provided with arcuate or re-entrant portions as illustrated in FIG. 7 to prevent radially outward movement of the pivot pins of the vanes when the impeller is assembled. It will be understood that suitably spaced slots are provided throughout the peripheral extent of the support plate E and that all of the slots are channels in any one plate would normally be alike, the three different kinds shown in FIG. 7 being illustrated merely by way of example.

In FIG. 8, there is illustrated a further embodiment in which the releasable locking means for the impeller assembly is positioned above the support plate E. As in the embodiment shown in FIG. 6, the support plate E is provided with a central opening P2 and radiating slots Q to receive the pivot pins G of vanes F which are here shown as double vanes. The pressure plate I has a raised central portion fitting into the opening P2 of the support plate E and raised spokes fitting into the slots Q of plate E, but somewhat shorter, so as to accommodate pivots of the vanes. The interengagement of these raised portions on pressure plate I with the openings in support plate E, prevents relative rotation. The pressure plate I is secured to shaft B by a screw J and is held against rotation relative to the shaft B by keys R, R' which also engage in recesses in the hub A and serve to limit rotational movement of the hub A and plate D relative to the shaft B.

The gear plate D may be made solid with the hub A as by welding, but as illustrated in FIG. 8, is secured against rotation relative to the hub A by means of keys L, L' fitting in holes provided respectively in the hub A and gear plate D. The hub A together with gear plate D are free to slide and to pivot on the shaft B within the limits permitted by the recesses provided in hub A for the keys R, R'. As in the embodiment described above, the gear plate D meshes with gear portions of the vanes (only one of which is shown) so that the vanes can be turned about their pivots to different angular positions by rotation of the hub A and gear plate D relative to the support plate E on which the vanes are pivoted. When the vanes have been adjusted to selected position, they are locked in such position by means of a nut U which is screwed onto a threaded portion Y of the shaft B and can be screwed down so as to clamp the gear plate D and support plate E between the hub A and pressure plate I. The vane F is shown as being double-faced and correspondingly double-geared so that it can be mounted either side up as a matter of convenience. Alternatively, it will be understood that single-faced vanes can be used.

Rotation of the impeller hub A may be controlled at a distance by remote control either when the impeller is still or in motion. For example, as illustrated in FIG. 10, the hub A may be provided with a tube S of any desired length affixed to it and surrounding the shaft B. At its upper end, the tube S is provided with holding means such as a nut V welded thereto. In this case, the nut U will lock the hub A and plate D by pressing downwardly on the nut V at the upper end of the tube S. The construction is otherwise the same as illustrated in FIG. 8.

Figure 11:
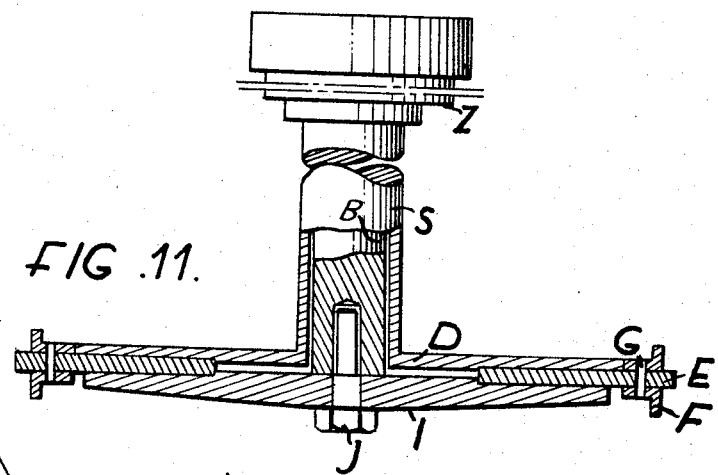
FIG. 11 is a cross sectional view of an assembled impeller similar to that of FIG. 8, but shown combined with a torsioning device.
Figure 12:
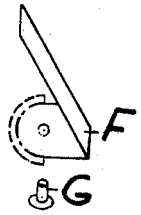
FIGS. 12 to 19 are perspective schematic views of various forms of single-faced vanes.
Figure 13:
Figure 14:
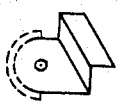
Figure 15:
Figure 16:
Figure 17:
Figure 18:
Figure 19:
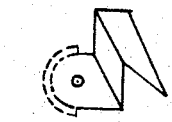
Figure 20:
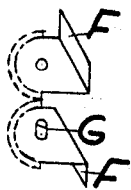
FIGS. 20 to 27 are perspective schematic exploded views of various forms of double-faced vanes.
Figure 21:
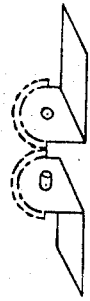
Figure 22:
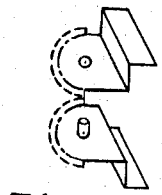
Figure 23:
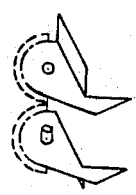
Figure 24:
Figure 25:
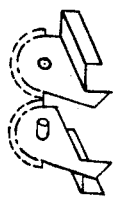
Figure 26:
Figure 27:

A similar construction is illustrated in FIG. 11 where the tube S extends upwardly from the gear plate D to a torsioning device Z providing for limited rotational movement of the tube S and attached gear plate D relative to the shaft B to which the pressure plate I and support plate E are affixed. The torsioning device Z permits variation of the vane angle either manually or automatically while the impeller is either stationary or in motion. For this purpose, the torsioning device Z may be operative to cause the gear plate D to rotate at a small differential speed relative to the speed of the shaft B and support plate E while the impeller is in motion. The torsioning device Z may be a rack and pinion, cooperating sleeves with helical grooves or sets of levers transforming an axial displacement into an angular displacement. A suitable torsioning device is illustrated by way of example in FIG. 29.

In impellers in accordance with the invention, vanes of various shapes may be used. A number of shapes of single vanes are shown by way of example in FIGS. 12 to 19.

Examlpes of different shapes of double vanes are similarly shown in FIGS. 20 to 27. The two vanes of a pair constituting the double vane, may either be alike or different as desired. In FIG. 28, there is shown a vane having two gear portions, but only one blade. The two vanes of a pair are secured to one another by the pivot pin G so that they turn together. Hence, a double vane can be controlled as to its angular position either by two gear plates D and D' rotating together as illustrated in FIG. 6, or by a single gear plate as illustrated in FIG. 8.

In the embodiment illustrated in FIGS. 29 and 30, the impeller comprises a support plate 10 secured on the lower end of an impeller shaft 11 by means of a pressure plate 12 and screw studs 13. A plurality of vanes 14 are pivotally mounted by pivot pins 15 extending between the support plate 10 and an upper plate 16. The vanes are T-shaped as viewed in cross section (FIG. 29) and comprise a projecting blade portion 14a and a gear portion 14b which meshes with a central control gear plate 17 which is sandwiched between the plates 10 and 16 and fixed to a hub 18 which is capable of at least limited rotation relative to the impeller shaft 11. A snap ring 19 retains the upper plate 16 in place while permitting relative rotary movement between the gear plate 17 and the plate 16, which is rotationally fixed to the support plate 10. It will thus be seen that the angular position of the vanes 14 is controllable by relative rotation between the hub 18 carrying the central gear 17 and the impeller shaft 11 which carries the support plate 10.

Suitable torsioning means is provided for turning the hub 18 relative to the impeller shaft 11 to adjust the angular positions of the vanes 14 when the impeller is stationary or when it is in operation. In FIG. 29, such torsioning means is illustrated by way of example as comprising a collar 21 which is screwed onto a threaded lower end portion of a sleeve 22 in which the impeller shaft 11 is rotationally supported by bearings 23. An inner collar 24 is connected to the collar 21 through a bearing 25 so as to be rotatable with the impeller shaft 11, but movable in an axial direction with the collar 21 when the latter is screwed up or down on the sleeve 22. In the lower portion of the inner collar 24, there is provided a transverse recess 26 which receives a transverse member 27 fixed on the shaft 11 and carrying a stub shaft 28 which is radial of the impeller shaft 11. A conical gear sector 29 rotatable on the stub shaft 28 engages gear teeth 26a provided on a wall of the recess 26 and also engages a gear 31 which is rotatable on the impeller shaft 11. The gear 31 is provided at its lower end with an internal gear 31a which engages an external gear 31b fixed to the upper end of tube 33 connected with the hub 18 of the impeller. The gears are enclosed by a cup-shaped housing 34 removably secured on the collar 21. The collar 21 is readily rotatable by means of a rod or handle 35.

In the operation of the torsion means, the collar 21 is rotatable by means of the handle 35 to screw it up or down on the sleeve 22. The resulting axial movement of the collar 21 is transmitted through the bearing 25 to the inner collar 24 which rotates with the impeller shaft 11. By virtue of the gear teeth 26a of the inner collar 24 meshing with the gear sector 29, axial movement of the inner collar results in rotary movement of the gear 31 relative to the impeller shaft. This movement is transmitted through the sleeve 32 and tube 33 to the collar 18 and hence to the gear plate 17 of the impeller so as to cause the vanes 14 to turn on their pivots in one direction or the other, depending on the direction of rotation of the collar 21. When the vanes have been moved to the desired position, they are held in such position by the collar 21 acting through the interconnecting mechanism that has been described.

Figure 31:
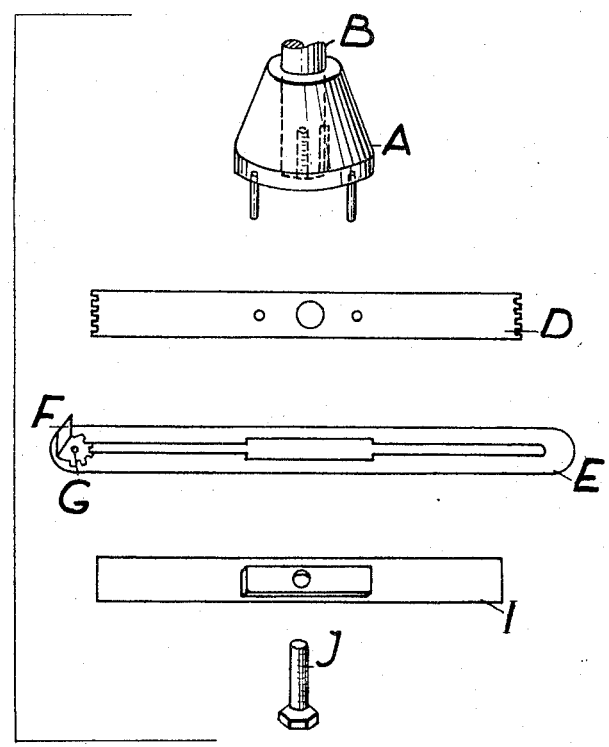
FIG. 31 is an exploded schematic perspective view of a simplified mixing impeller.

While in the embodiments so far described, the support plates for the vanes and the gear plates for controlling the position of the vanes are shown as being circular, it will be understood that other shapes may be used if desired. For example, the support plates and gears may comprise two or more symmetrically arranged arms or sectors instead of being in the form of a continuous circle. Such modification is illustrated by way of example in FIG. 31 where the support plate E, gear plate D and pressure plate I are shown as elongated members.

Figure 32:
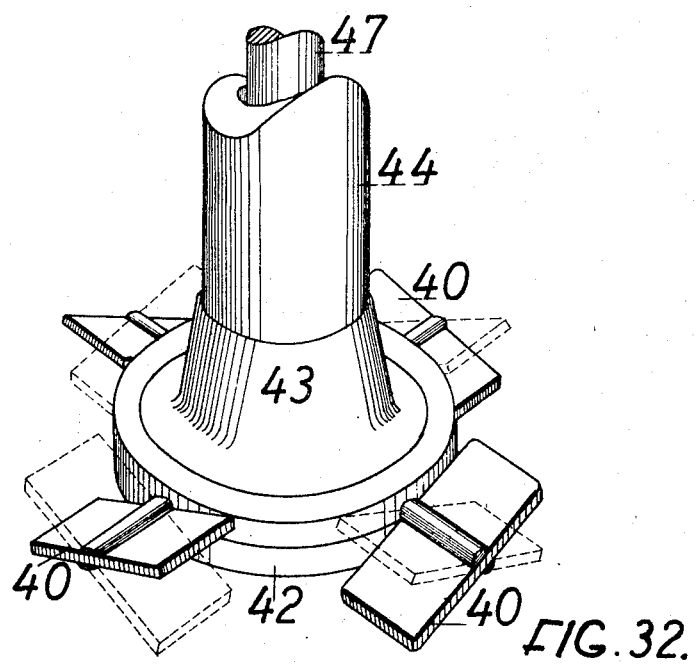
FIG. 32 is a schematic perspective view of another form of mixing impeller.
Figure 33:
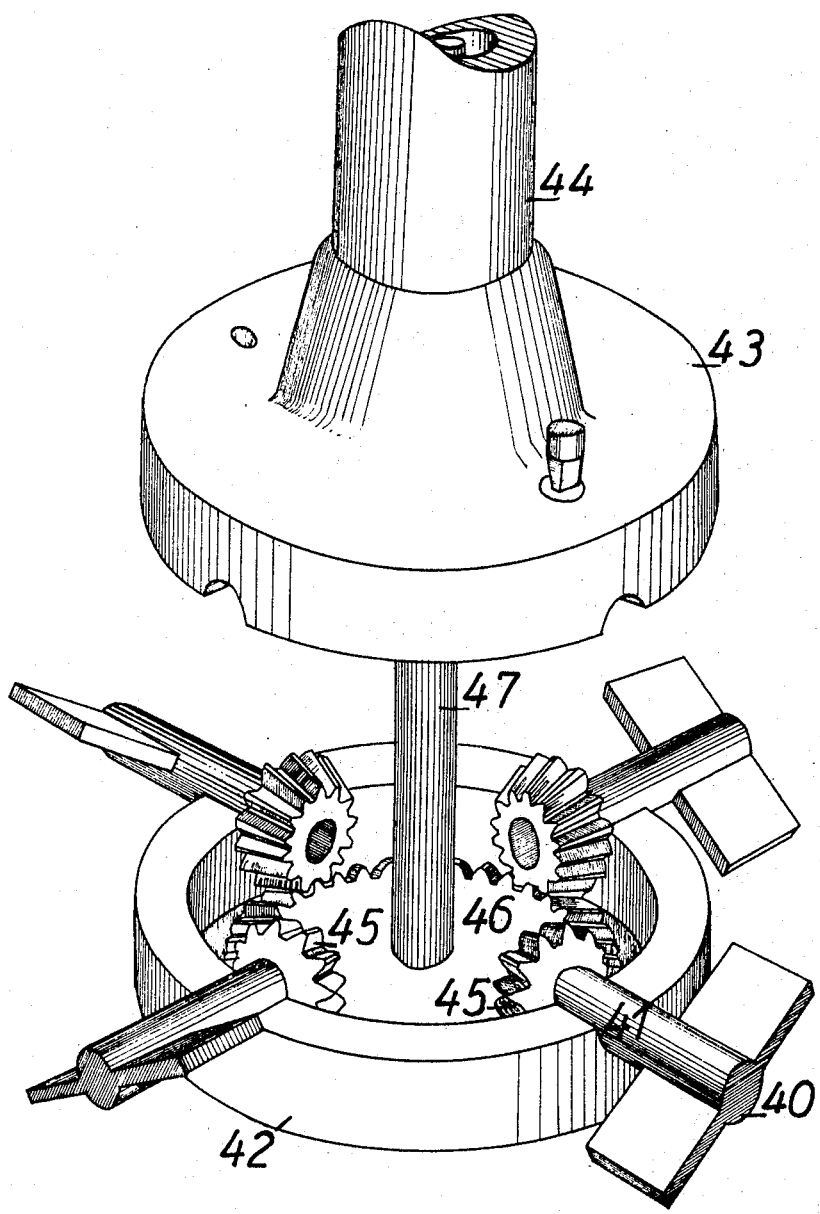
FIG. 33 is a schematic perspective exploded view of a mixing impeller of the kind shown in FIG. 32.

In a further embodiment illustrated in FIGS. 32 and 33, the vanes of the impeller are pivoted about axes disposed radially of, instead of parallel to, the impeller shaft. Each of the vanes 40 is provided with a stem portion 41 which is rotatably received in radial recesses provided in a split housing comprising a support plate 42 and a cover 43. Suitable means (not shown) is provided for securing the two parts of the housing together and preferably providing a fluid-tight seal between them. The upper portion 43 of the housing is fixed on the lower end of a sleeve 44. Bevelled gears 45 provided on the inner ends of the stem portions 41 of vanes 40 and disposed inside the housing mesh with a central bevel gear 46 secured on the lower end of a shaft 47 which extends inside of, and is rotatable relative to, the sleeve 44. A suitable torsion means, for example like that illustrated in FIG. 29 is provided between the sleeve 44 and shaft 47 so that the two normally rotate together during operation of the mixing apparatus, but can be turned relative to one another either manually or automatically so as to rotate the central gear 46 inside the housing 42, 43 and thereby turn the vanes 40 about their respective pivotal axes so as to adjust the annular position of the vanes.

Figure 34:
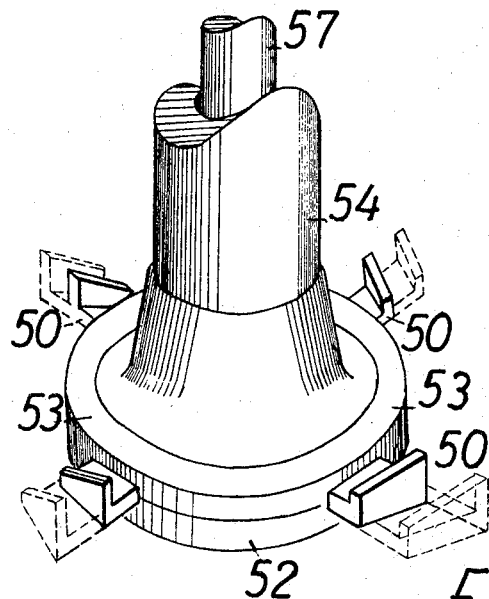
FIG. 34 is a fragmentary perspective view of an impeller similar to that of FIG. 32, but of modified construction.
Figure 35:
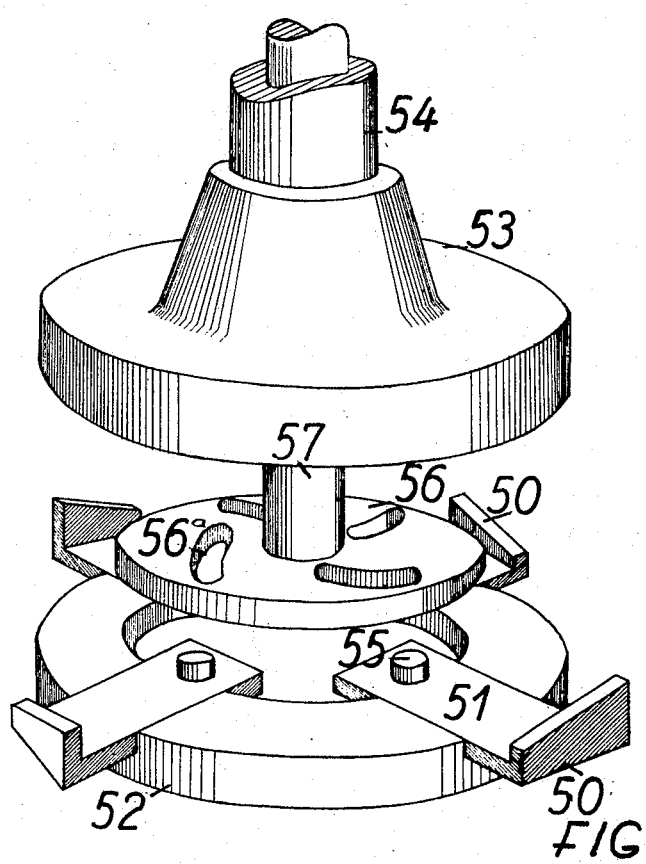
FIG. 35 is an exploded perspective schematic view of a mixing impeller like that shown in FIG. 34.

In a further embodiment illustrated in FIGS. 34 and 35, the vanes are adjustable by being slidable instead of pivoted. A plurality of vanes 50 have stem portions 51 which are slidably received in radial recesses provided in a split housing comprising a support plate 52 and a cover 53 which are suitably secured together, preferably with sealing means to make the housing fluid tight. The upper portion 53 of the housing is fixed on the lower end of a sleeve 54. In the inner end portions of the vane stems 51 disposed inside the housing there are provided projecting studs 55 which are received respectively in cam slots 56a provided in a cam plate 56 secured on the lower end of a shaft 57 which extends up through the sleeve 54. The sleeve 54 and shaft 57 normally rotate together during operation of the mixing apparatus, but can be turned relative to one another through a selected angle by means of a suitable torsioning device, for example, like one illustrated in FIG. 29. It will be seen that relative rotational movement of the sleeve 54 and shaft 57 results in turning the cam member 56 relative to the housing 52, 53 in which the vanes 50 are slidably mounted. The cam slots 56a in the cam member 56 are of such shape that this rotation results in sliding the vanes inwardly or outwardly as desired and holding them in selected position with corresponding modification of peripheral speed but without increase of blade effective area.

Figure 36:
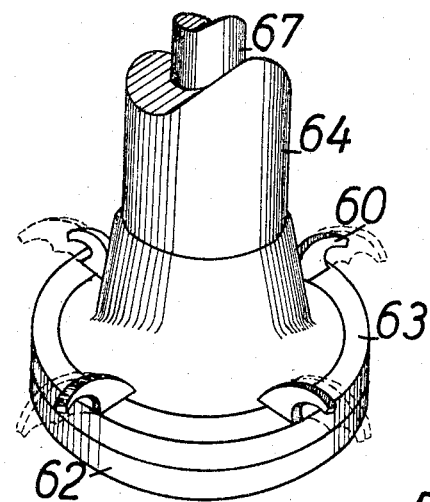
FIG. 36 is a schematic perspective view of a further form of mixing impeller.
Figure 37:
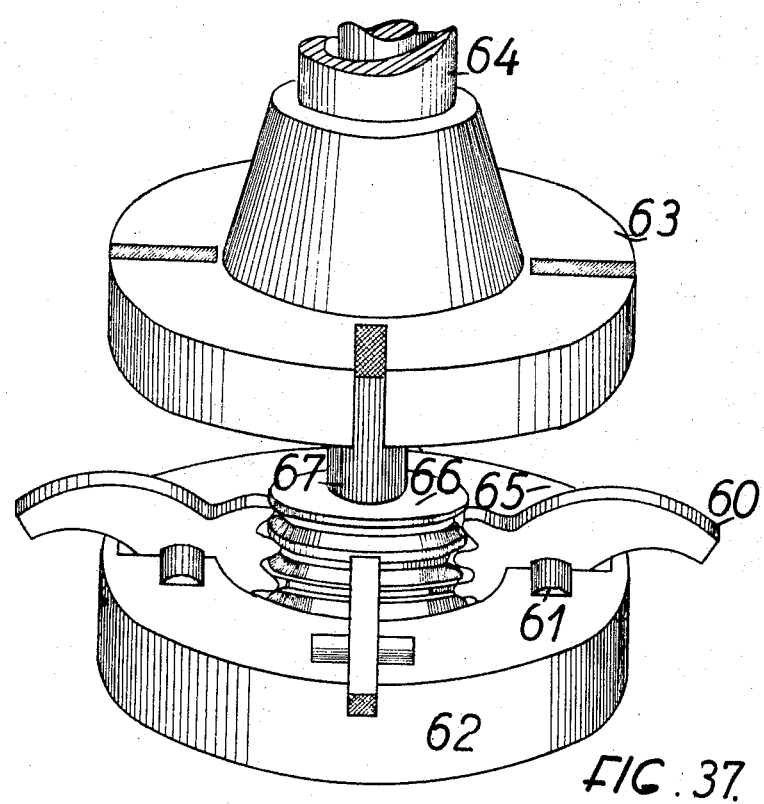
FIG. 37 is an exploded perspective schematic view of an impeller like that shown in FIG. 36.

In a further embodiment of the invention illustrated in FIGS. 36 and 37, the vanes of the impeller are adjustable by pivotal movement about axes which lie in a plane perpendicular to the axis of rotation of the impeller and are perpendicular to radii passing through the respective vanes. Each of the vanes 60 is provided with a pivot shaft 61 and is received in a corresponding slot or recess in a split housing comprising a support plate 62 and an upper portion 63 secured to the lower end of a sleeve 64. As in the embodiments described above, suitable means is provided for securing the parts of the split housing together, preferably with a fluid tight seal, and for moving said vanes about their pivots. In the drawings, the actuating means is shown as comprising gear sectors 65 provided on the inner portions of the respective vanes, inside the housing, and meshing with a worm gear 66 secured on the lower end of a shaft 67 which extends up through the sleeve 64. As described with reference to other embodiments, the sleeve 64 and shaft 67 normally rotate together during operation of the mixing apparatus but can be turned relative to one another by suitable torsion means. Such relative rotation results in worm gear 66 being turned relative to the housing 62, 63 and thereby turning all of the vanes 60 about their respective pivot axes 61. The active portions of the vanes are arcuately shaped in such manner that pivotal movement of the vanes results in larger or smaller portions of the vanes extending outwardly of the housing 62, 63 so that both the effective area and effective diameter of the vanes is increased or decrease as desired, depending on the direction and the amount of relative rotation of the shaft 67 and sleeve 64. Alternatively, the vanes can be turned about their pivots by moving the shaft 67 in an axial direction, in which event, teeth on gear 66 act as racks meshing with the gear sectors 65 on the vanes so that axial movement of shaft 67 is converted into pivotal movement of the vanes.

Figure 38:
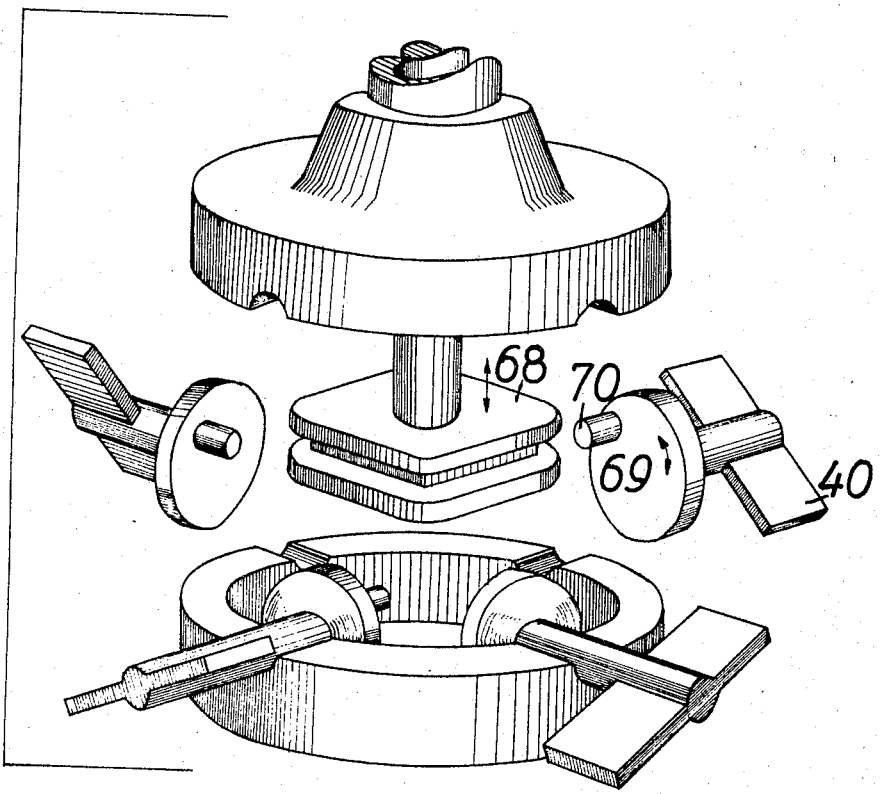
FIG. 38 is an exploded perspective view of a further modification.

In FIG. 38, there is shown a further modification which is similar to that of FIGS. 32 and 33 but utilizes different means for actuating the impeller vanes. On the inner end of the stem portion of each vane 40, there is fixed a crank disc 69 carrying a stud 70 which is eccentric relative to the pivotal axis of the vane. The studs 70 of the respective vanes are engaged by a cam 68 carried by the shaft 47. Raising or lowering the cam 68 by means of the shaft 47 turns the vanes 40 about their respective pivotal axes so as to adjust the angular positions of the vanes without changing the effective diameter or peripheral speed of the impeller.

When the position of the impeller vanes is to be controlled by axial movement of a control member as described by way of example in conjunction with FIGS. 37 and 38, suitable means is provided for moving the control member axially as desired. For example, with reference to FIG. 29 where there is illustrated mechanism for converting angular movement of the collar 21 into axial movement of the collar 24 and reconverting the axial movement of collar 24 into angular movement of sleeve 32 and gear plate 17, it is only necessary to eliminate the second conversion stage and transmit the axial movement of collar 24 to the axially movable control member such as cam 68 in FIG. 38.

Figure 39:
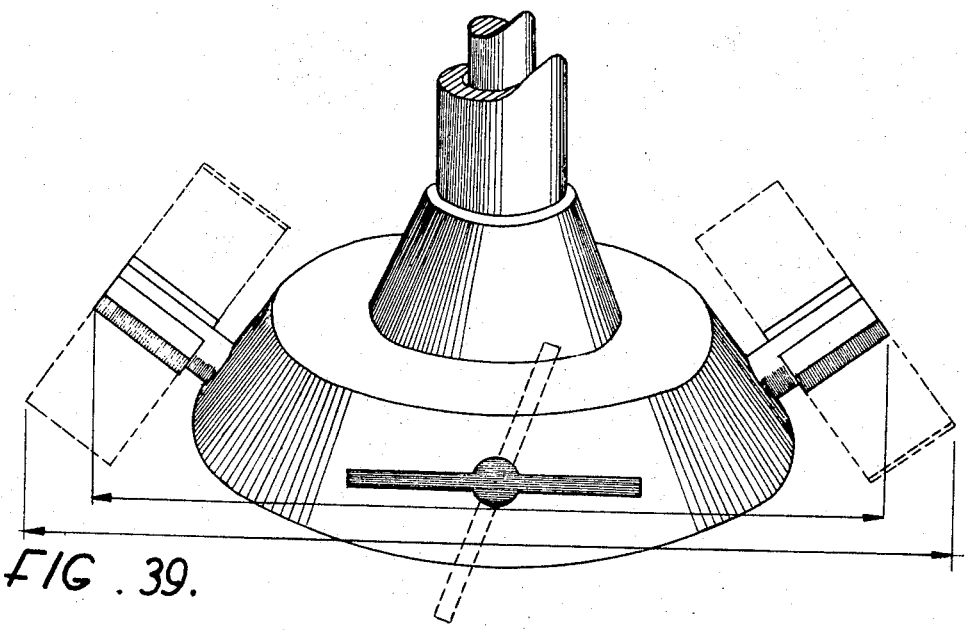
FIG. 39 is a perspective view of an embodiment similar to FIG. 32.

Instead of being disposed radially as in FIGS. 32 and 38 or parallel to the impeller shaft as in FIG. 29, the pivot axes of the vanes may be inclined, and is illustrated by way of example in FIG. 39. In this instance, adjustment of the angular positions of the vanes results in a combined variation of effective area of the vanes and effective diameter of the impeller. In the embodiment of FIG. 39, the pivotal adjustment of the vanes is effected by suitable control mechanism, for example like that illustrated in FIG. 33.

While impellers have been shown with shafts extending upwardly, it will be understood that the impeller shafts may extend upwardly, downwardly or at an angle as described with reference to FIGS. 1 and 2.

It will also be understood that the various features of the several embodiments shown and described are interchangeable with one another insofar as they are compatible and that other modifications may be made without departing from the spirit and scope of the invention as defined by the annexed claims.

What I claim is:

1. In mixing apparatus having container means for holding materials to be mixed and a shaft extending into said container means and driven rotationally undirectionally in operation the improvement which comprises a mixing impeller comprising a support plate mounted concentrically on said shaft and rotating undirectionally therewith, said support plate being positioned in operation in material held in said container to be mixed, a plurality of vanes each having a rectilinear upstanding face portion and a gear portion, said vanes being swivelly mounted by said gear portions on said support plate and spaced circumferentially therearound adjacent the periphery of said support plate with said rectilinear upstanding face portions projecting from said support plate and said gear portions approximately parallel to said support plate swivelling means located above said support plate, said swivelling means engaging the gear portions of said vanes for simultaneously pivoting all of said vanes to secured selected angles to respective tangents to the periphery of the support plate at each vane position, whereby said vanes are adjustable to secure desired mixing characteristics for the material being mixed.

2. A mixing impeller according to claim 1, wherein said vanes are removably mounted on said support plate for quick removal and replacement.

3. A mixing impeller according to claim 2, wherein support plate has a central opening and channels extending radially outwardly from said opening and wherein each of said vanes has a pivot which is insertable through said central opening and movable outwardly in a respective one of said channels to mount said vane on said support plate.

4. A mixing impeller according to claim 2, wherein support plate has peripherally opening channels extending inwardly from the periphery of said support plate and then circumferentially and wherein said vanes have pivot portions insertable respectively in said channels to mount said vanes on said support plate.

5. A mixing impeller according to claim 1, wherein vanes are mounted on both upper and lower surfaces of said support plate.

6. A mixing impeller according to claim 5, wherein vanes are arranged as oppositely facing pairs of vanes disposed on opposite faces of said support plate and having a common pivot connecting the vanes of a pair.

7. A mixing impeller according to claim 6, wherein said support plate is provided with channels receiving said pivots connecting opposite vanes of a pair to mount said vanes removably on, and to remove them from said support plate without disassembling said pairs.

8. A mixing impeller according to claim 6, wherein said swivelling means comprises two plate gears disposed respectively on opposite faces of said support plate and engaging respectively said gear portions of the vanes mounted on opposite faces of said support plate.

9. A mixing impeller according to claim 8, wherein means is provided connecting said plate gears to rotate together to swivel said vanes on opposite faces of said support plate simultaneously.

10. A mixing impeller according to claim 1, wherein said swivelling means comprises a plate gear rotatable concentrically with said shaft and engaging said gear portions of vanes to swivel said vanes simultaneously upon rotation of said plate gear relative to said support plate.

11. In mixing apparatus having container means for holding materials to be mixed and a shaft extending into said container means and driven rotationally in operation, the improvement which comprises a mixing impeller rotationally driven by said shaft while disposed in the material to be mixed and comprising support means carried by said shaft, a control plate atop said support means and rotatably mounted on said shaft, said plate having gear teeth thereon, at least one pair of vanes pivotally mounted on said support means and having gear portions meshing with said gear teeth of said control plate and active rectilinear upstanding faces projecting relative to a respective major face of said plate, said active faces being disposed in operation at a selected angle relative to a plane tangential to said plate at the location of the respective vane, the angular positions of said vanes being variable simultaneously by rotational movement of said plate relative to said support means and means for securing said plate against rotational movement relative to said support means to secure said vanes in selected angular position.

12. A mixing impeller according to claim 11, wherein said support means comprises a second plate having a greater radial dimension than said control plate to provide portions projecting beyond the periphery of said control plate, said vanes being pivotally mounted on said projecting portions.

13. In mixing apparatus having at least one shaft driven rotationally unidirectionally in operation and container means for holding media to be mixed, the improvement which comprises a mixing impeller comprising a carrier plate secured in operation on said shaft and rotating unidirectionally therewith, a plurality of turbine impeller vanes circumferentially spaced and movably mounted on said carrier plate, each of said vanes having a control portion and an active rectilinear upstanding face substantially perpendicular to the plane of rotation of said carrier plate and a control disc concentric with said shaft atop of said carrier plate and rotatable relative to said carrier plate, said control disc engaging said control portion of each of said vanes to move said vanes jointly to vary the effective projected area of the active faces of said vanes and means for moving said control disc relative to said carrier plate and securing it in selected position to position said vanes in selected position on said carrier plate.

14. In mixing apparatus having at least one shaft driven rotationally unidirectionally in operation and container means for holding media to be mixed, the improvement which comprises a mixing impeller comprising a carrier member secured in operation on said shaft to rotate unidirectionally therewith, a plurality of turbine impeller vanes angularly spaced around said shaft and movably mounted on said carrier member, each of said vanes having a control portion with gear teeth thereon and an active face substantially rectilinear upstanding and perpendicular to the plane of rotation of said carrier member, and a control gear concentric with said shaft atop of said carrier member and rotatable relative to said carrier member, said control gear having teeth engaging said teeth of said control portions of said vanes to move said vanes jointly to vary the effective projected area of the active faces of said vanes and means atop of said control gear for moving said control gear relative to said carrier member and for securing it in selected position to move said vanes to and secure them in selected position on said carrier member and thereby vary the mixing characteristics of the impeller.

15. In mixing apparatus having at least one shaft driven rotationally unidirectionally in operation and container means for holding media to be mixed, the improvement which comprises a mixing impeller comprising a carrier member secured in operation on said shaft to rotate therewith, a plurality of turbine impeller vanes angularly spaced around said shaft and pivotally mounted on said carrier member, each of said vanes having a control portion and an exposed active rectilinear upstanding face engageable with said media in operation to impart mixing movement to said media and a control member concentric with said shaft atop of said carrier member and rotatable relative to said carrier member, said control member engaging said control portion of each of said vanes to govern from above said vanes jointly about their pivots to vary the angular position of said vanes on said carrier member and means for governing from above said control member rotationally relative to said carrier member and securing it in selected position to move said vanes to and secure them in selected angular position on said carrier member and thereby vary the mixing characteristics of the impeller.

16. A mixing impeller according to claim 15, wherein said vanes are pivotally mounted on said carrier member about axes radiating from said shaft and rotate about said axes.

17. A mixing impeller according to claim 15, wherein said vanes are pivotally mounted on said carrier member to turn about axes which are parallel to said shaft.

18. A mixing impeller according to claim 15, wherein said vanes are pivotally mounted to turn about axes which are tangential to a circle concentric with said shaft.

19. In mixing apparatus having a container for holding media to be mixed, the improvement comprising coaxial shafts rotating in operation in one direction only, a carrier member secured in operation on a first one of said shafts and rotating therewith, a plurality of turbine impeller vanes angularly spaced around said shaft and movably mounted on said carrier member, each of said vanes having a control portion and an exposed active rectilinear upstanding face projecting from said carrier member and engageable with said media in operation to impart mixing movement to said media, and a control member secured in operation on a second one of said shafts and movable therewith, said control member engaging said control portion of each of said vanes to move said vanes jointly to vary the position of said vanes on said carrier member and thereby vary the action of said vanes on said media, said second shaft provided with releasable locking means located atop of said control member on said second shaft said second shaft being movable relative to said first shaft to move said control member relative to said carrier member and thereby securely and selectively position said vanes relative to said carrier member during operation of the mixing apparatus.

20. A mixing impeller according to claim 19, wherein said vanes are slidable in a direction radial of said shaft and thus vary the effective diameter of said impeller and thereby vary the peripheral speed of material ejected by said vanes.

References Cited

UNITED STATES PATENTS

| | | | |
|---|---|---|---|
| 427,375 | 5/1890 | Smith et al. | 170—160.24 |
| 491,006 | 1/1893 | Boyer | 170—160.24 X |
| 650,802 | 5/1900 | Steinruck | 170—160.24 X |
| 1,345,542 | 7/1920 | Hartshorn | 259—107 |
| 1,509,286 | 9/1924 | Colby | 170—160.24 |
| 1,656,017 | 1/1928 | Ring | 170—160.24 |
| 1,689,083 | 10/1928 | Ringel | 170—160.24 |
| 3,175,810 | 3/1965 | Beyeler | 259—134 |

FOREIGN PATENTS 217,913  10/1958  Australia.

WILLIAM I. PRICE, *Primary Examiner.*